May 3, 1927.
C. M. LEE
MIRROR MOUNTING
Original Filed March 12, 1926
1,627,395
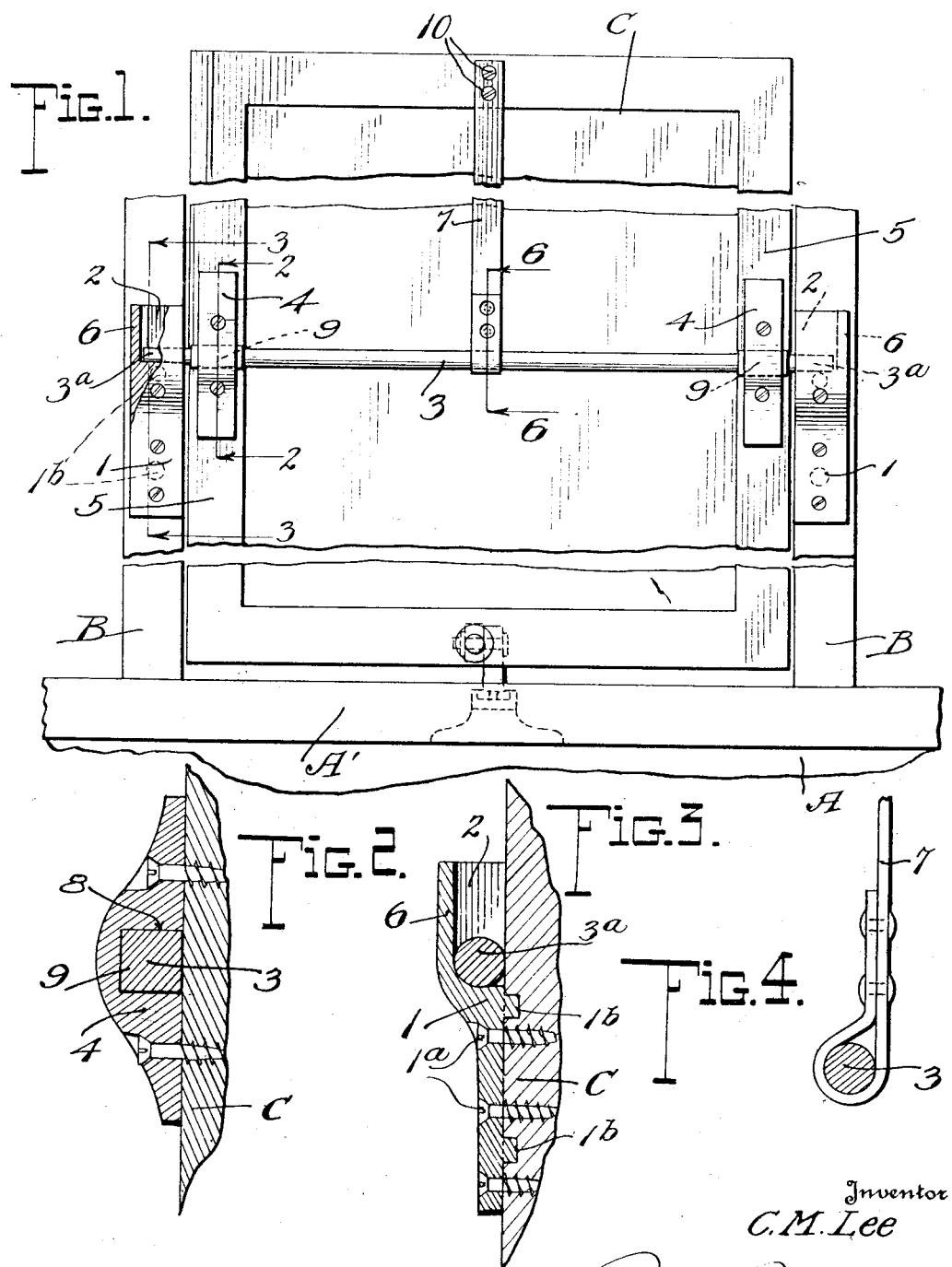

Patented May 3, 1927.

1,627,395

UNITED STATES PATENT OFFICE.

CHARLES M. LEE, OF SHREVEPORT, LOUISIANA.

MIRROR MOUNTING.

Original application filed March 12, 1926, Serial No. 94,245. Divided and this application filed March 12, 1926. Serial No. 94,246.

This invention relates to improvements in mirror mountings of that type which is referred to in my copending application Serial No. 94,245, filed of even date herewith, for mirror adjusters, of which this is a division.

More specifically speaking, the object of my present invention is to provide a mounting for large and heavy frames which will not only enable the frame to be readily and quickly removed but in use will prevent their sagging and consequently the likelihood of displacement of alignment and frictional binding of the frame pivots.

While this mounting is particularly designed to be used in conjunction with adjusting means for adjusting the position of the mirror employed upon furniture such as dressers or bureaus and the like, it is to be understood that I do not wish to be confined to any such specific application.

It is of particular advantage, however, in this relation because of the desirability of a free moving pivotal support which eliminates the use of frictional binding at the pivots to maintain the adjusted positions of the mirror. The mirror adjusting means which is preferably used in conjunction with this mounting being the subject of copending application above referred to, is not specifically described or shown herein.

Other objects and advantages of the invention will be hereinafter set forth and the novel features thereof defined by the appended claim.

In the drawings:

Figure 1 is a rear elevation of the upper portion of a dresser showing my special mounting for the mirror;

Figure 2 is an enlarged sectional view on the line 2—2 of Figure 1;

Figure 3 is a similar view on the line 3—3 of Figure 1; and

Figure 4 is a sectional view on the line 4—4 of Figure 1.

Like reference characters designate corresponding parts throughout the several figures of the drawing.

Referring to the drawing, A' designates the dresser top and B the side supporting standards for the mirror C. To the rear faces of these standards B are connected the socket members 1 attached in any desired manner, as by screws 1ª, but preferably having lugs or dowels 1ᵇ which tend to prevent likelihood of sagging. The sockets 2 of the members receive the pintle ends 3ª of the cross rod 3 attached to the mirror frame 5 by means of the clips or brackets 4, these brackets having rectangular openings 8 to receive the correspondingly formed portions 9 of the rod whereby rotation of the rod with respect to the brackets is prevented.

Longitudinal shifting of the rod 3, and consequently sidewise movement of the mirror, is precluded by the formation of each socket member with a side wall 6.

To insure maintenance of proper alignment of the rod 3 I employ a strap support 7 which is secured to the center of the mirror frame at the top as indicated at 10 and to the center of the rod. This is of special advantage where a heavy mirror is provided.

It will be obvious from the foregoing that the mirror frame may be easily displaced from the bureau by merely lifting the pivots from the sockets 2 and owing to the ease with which this may be done it is unlikely that one will take the risk of moving the article of furniture without dismounting the frame.

Having thus described my invention, what I claim as new is:

A mounting for mirrors comprising open socket members, a pivot bar having an angular portion for attachment to the rear of the mirror, a clip with a seat cooperating with said portion for securing the pivot bar to the mirror frame adjacent its end portions, and bracing means connected at one end to the mirror frame at the top and at its other end to the bar at an intermediate point.

In testimony whereof I affix my signature.

CHARLES M. LEE.